(12) United States Patent
Jimenez et al.

(10) Patent No.: US 7,337,447 B2
(45) Date of Patent: Feb. 26, 2008

(54) INFORMATION HANDLING SYSTEM FEATURING A SINGLE PIPE STRING DRIVEN ARCHITECTURE FOR BRIDGING DATA OF HETEROGENEOUS OBJECT SOURCE IN NATIVE SUBSYSTEMS TO JAVA USING NATIVE INVOCATION INTERFACES

(75) Inventors: Javier Luis Jimenez, Austin, TX (US); Christopher Abella Poblete, Austin, TX (US); Anil Venkatasubba Rao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 695 days.

(21) Appl. No.: 10/349,660

(22) Filed: Jan. 23, 2003

(65) Prior Publication Data

US 2004/0148609 A1    Jul. 29, 2004

(51) Int. Cl.
*G06F 9/54* (2006.01)
*G06F 13/38* (2006.01)

(52) U.S. Cl. .................................. 719/328; 719/314
(58) Field of Classification Search ............... 719/328; 709/231
See application file for complete search history.

(56) References Cited

U.S. PATENT DOCUMENTS

| 6,085,307 | A | 7/2000 | Evoy et al. |
| 6,195,774 | B1 | 2/2001 | Jacobson |
| 6,314,445 | B1* | 11/2001 | Poole .............................. 718/1 |
| 6,330,658 | B1 | 12/2001 | Evoy et al. |
| 6,418,461 | B1 | 7/2002 | Barnhouse et al. |
| 6,473,759 | B1 | 10/2002 | Herrendoerfer et al. |
| 6,486,439 | B1 | 11/2002 | Spear et al. |
| 6,519,605 | B1* | 2/2003 | Gilgen et al. ............ 707/103 R |
| 6,785,015 | B1* | 8/2004 | Smith et al. ................ 358/1.15 |
| 6,854,122 | B1* | 2/2005 | Sheriff et al. ................ 719/316 |
| 6,865,733 | B2* | 3/2005 | Broussard .................... 717/147 |
| 6,874,020 | B1* | 3/2005 | Da Palma et al. .......... 709/223 |
| 6,915,520 | B2* | 7/2005 | Sanchez, II ................. 719/315 |

OTHER PUBLICATIONS

Zou et al., Web-based specification and integration of legacy services, IBM Centre for Advanced Studies Conference, p. 17, Year of Publication: 2000.*
Czajkowski et al., Automated and portable native code isolation, Software Reliability Engineering, 2001, ISSRE 2001. Proceedings. 12th International Symposium on, Nov. 27-30, 2001. pp. 298-307*
William Holt, Mar. 1999 discloses The embedded window toolkit porting java's AWT to an embadded system.*
(Microsoft, Computer Dictionary, 5th Edition, 578).*
JMX Instrumentation and Agent Specification, v1.0, May 2000, pp. 20-29.
www.dell.com/powersolutions, May 2002.
http://www.dell.com/us/en/esg/topics, Jan. 2003.

* cited by examiner

*Primary Examiner*—William Thomson
*Assistant Examiner*—Abdou K Seye
(74) *Attorney, Agent, or Firm*—Haynes and Boone, LLP

(57) ABSTRACT

An information handling system having a single pipe string driven data transport architecture includes a hardware independent execution environment subsystem and a native operating system environment subsystem. A data transport pipe is provided for integrating legacy instrumentation agents of the native operating system environment subsystem and new instrumentation agents of the hardware independent execution environment subsystem into a single integrated systems management application.

14 Claims, 3 Drawing Sheets

INFORMATION HANDLING SYSTEM FEATURING A SINGLE PIPE STRING DRIVEN ARCHITECTURE FOR BRIDGING DATA OF HETEROGENEOUS OBJECT SOURCE IN NATIVE SUBSYSTEMS TO JAVA USING NATIVE INVOCATION INTERFACES

BACKGROUND

The present disclosure relates generally to information handling systems, and more particularly to a single pipe string driven architecture, method, and apparatus for bridging data of heterogeneous object source in native subsystems to java using native invocation interfaces in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conjunction with information handling systems, an OpenManage System Administrator (OMSA) lightweight system administration tool consolidates all OpenManage instrumentation agents to a single integrated product. In consolidating all of the instrumentation agents, a large amount of legacy code has to be integrated along with new code. The majority of the legacy code is written in the native operating system (OS) and processor dependent language, while the rest is in Java. These instrumentation agents for the instrumentation subsystem which comprises the data access layer of OMSA. On the other end is the presentation layer of OMSA residing in the Java space.

Accordingly, it would be desirable to provide an architecture solution for overcoming the problems in the art as discussed above.

SUMMARY

An information handling system having a single pipe string driven data transport architecture includes a hardware independent execution environment subsystem and a native operating system environment subsystem. A data transport pipe is provided for integrating legacy instrumentation agents of the native operating system environment subsystem and new instrumentation agents of the hardware independent execution environment subsystem into a single integrated systems management application.

DETAILED DESCRIPTION

Figure 1:
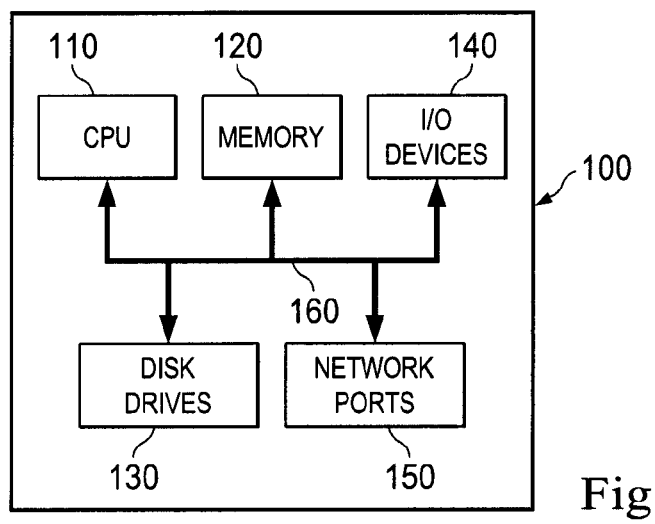
FIG. 1 illustrates a block diagram view of an information handling system according to an embodiment of the present disclosure.

One challenge addressed by the embodiments of the present disclosure is which technology and what architecture is feasible to successfully integrate legacy and new instrumentation agents into a single integrated systems management application while meeting the following requirements: secured; run in supported OS versions of Windows, Linux, and Netware; minimized testing and maintenance cost; extensibility and scalability; robustness and seamless integration; and headcount and schedule control and manageable.

Data mining from the instrumentation agents occurs in both the native subsystem and Java. Since the destination is in Java, we explore various existing transport technologies that crosses the Java-Native boundary and within Java. A widely used technology is remote procedure call (RPC), although it is confined in the native space. Remote method invocation (RMI), on the other hand, is the counterpart of RPC in Java. But like RPC, both are language dependent and confined to their space. Furthermore, both options fail the security requirement since network port connections are used.

A Common Object Request Broker (CORBA) is a feasible candidate. In spite of its many advantages, however, CORBA fails to fulfill the cost requirement and security. Unless developed in-house, which can be costly, CORBA requires third-party components to work. Consequently, it increases cost of ownership including maintenance havoc. Like the previous technologies, it uses network port connections, falling short of complying with security requirement.

A more Java concentric choice is the Native Invocation Interface (NII). It is an extension of the Java virtual machine (JVM) specification. Being part of the VM proves beneficial. Foremost, development is trivial since its integrating component is part of the VM development kit. There is no additional runtime component needed. These benefits help drive the cost of ownership and maintenance down. Furthermore, it does not use any network port connections or sockets for its data communication fulfilling the security requirement. However, support for the operating systems is dependent on the implementing vendor.

A variation of NII is the runtime native interface (RNI) developed by Microsoft. Clearly, its use is limited to Microsoft's Windows operating system. Another is Netscape's Java Runtime Interface (JRI) similarly limited in platform support. Sun's Java native interface (JNI), on the other hand, claims binary compatibility across multiple versions of JVM and support for Windows and Linux operating systems. Novell has also support for JNI for its Netware operating system.

Database connectivity through JDBC is a possible option for data transport. However, it fails our requirement test since it uses network port connections; requires third party components increasing cost of ownership and maintenance; and requires complex integration due to database query language involvement.

Technology realization precedes the choice of transport architecture. Accordingly, JNI is the technology that fulfills the requirement discussed herein above and we explore existing architectures available to JNI. One known existing architecture is the Vertical Stack approach. In the Vertical Stack architecture, there is a one to one mapping of API from the native OS subsystem up to the Java presentation layer. For every native API, there is a corresponding Java API. Thus each pair of this API comprises a vertical stack.

In the existing vertical stack architecture, as new subsystem APIs or services grow, so does the entire code base of the vertical stack architecture. With all native C data types, conversion to Java is required subject to restrictions, such as unsigned integer converted to signed Java integer. In addition, the Java-Native API grows as services grow, leading to code instability risk, while also increasing test regression and maintenance complexity. Also in connection with the existing vertical stack architecture, calling parameters and return types vary.

Further in connection with existing vertical stack architecture, the addition of a subsystem service requires a new stack. Stack creation involves addition of the following stack layer: (1) data access (2) JNI (3) Java API. The mirroring variant involves migrating associated structures and definitions to Java objects. Still further, the addition of a new stack requires recompilation of code from top to bottom on all operating systems (OS), thereby increasing cost of maintenance and headcount requirement. Changes to the subsystem API may potentially require costly modification to the entire stack. Changes to the stack framework specification or definition requires enormous changes, notwithstanding regressing test cases.

Alternatively, a variation of the above Vertical Stack architecture is the mirroring of objects or structures. For each structure defined in the native layer there is a corresponding object definition in the Java layer. Both possess significant disadvantages. This architecture requires all native C data types propagated up to the stack converted into the Java space consequently subjected to the idiosyncrasies of Big Endian Little Endian and instruction word size. Careless handling of such type conversions leads to instability of the code, thus increasing the risk of crashing the entire process. In addition, as the stack grows so does the risk of instability. Comparatively, the one to one mapping variant have N-number of JNI code base while the mirroring variant have M-number of redundant code base.

FIG. 1 depicts a high level block diagram of an information handling system 100 in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In particular, the system block diagram of FIG. 1 illustrates an information handling system 100 that includes a central processing unit (CPU) 110, memory 120, disk drives 130, such as a hard disk drive, a floppy disk drive, a CD-ROM drive, or other storage devices, and input/output (I/O) devices, such as a display, a keyboard, a mouse, and associated controllers, collectively designated by a reference numeral 140. System 100 further includes one or more network ports and various other subsystems, such as a network interface card, collectively designated by a reference numeral 150, all interconnected via one or more buses, shown collectively as a bus 160.

Figure 2:
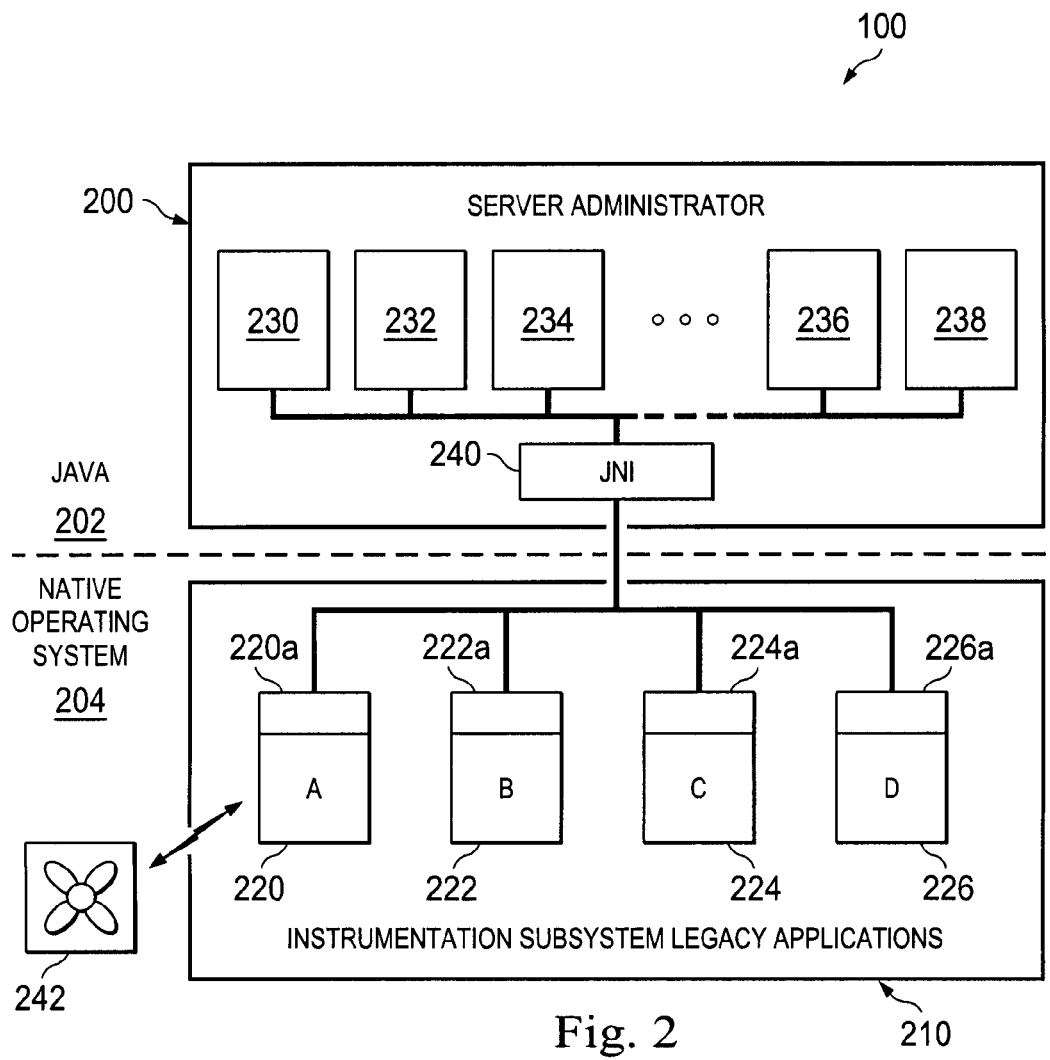
FIG. 2 illustrates a system block diagram view of an information handling system having a server administrator coupled via a single pipe string driven data transport architecture to an instrumentation subsystem of legacy applications according to one embodiment of the present disclosure.

FIG. 2 illustrates a system block diagram view of an information handling system 100 having a server administrator 200 coupled via a single pipe string driven data transport architecture to an instrumentation subsystem 210, according to one embodiment of the present disclosure. Subsystem 210 includes a number of legacy applications 220, 222, 224, and 226, for example. Server administrator 200 includes a graphical user interface/common line interface (GUI/CLI) presentation layer of the single pipe string driven data transport architecture of information handling system 100.

System administrator 200 provides a common access mechanism to communicate with the various legacy applications of the instrumentation subsystem. In one embodiment, the information handling system includes a server, wherein the server provides a platform which utilizes the instrumentation agents. Instrumentation agents can be configured to monitor any one of a number of parameters/operating conditions of the information handling system. For example, an instrumentation agent 220 might be configured to monitor one or more fans 242 in the information handling system, wherein the instrumentation agent collects data regarding or relating to the one or more fans being monitored.

According to one embodiment, server administrator 200 operates with a hardware independent execution environment space 202 and the instrumentation subsystem 210 operates in a native operating system environment space 204. For example, in one embodiment, the hardware independent execution environment space includes a Java space. In addition, the native operating system space 204 may include C/C++ based legacy applications.

System administrator 200 hosts a number of various client plug-ins 230, 232, 234, 236 and 238 for interfacing with respective ones of legacy applications 220, 222, 224, and 226 of the instrumentation subsystem 210, for example, via coupling interfaces 220a, 222a, 224a, and 226a. In one embodiment, the single pipe string driven data transport architecture includes a Java native interface (JNI) 240 for coupling the client plug-ins to a respective ones of the coupling interfaces of the legacy applications. Obtaining data from a desired legacy application involves invoking a specific plug-in module of the various client plug-ins adapted for the respective legacy application. The coupling interfaces of the respective ones of the legacy applications provide a common interface for sending/receiving data to/from the system administrator, i.e., via the GUI/CLI of the system administrator. The common interface utilizes a data conversion layer, including classes and JNI interfaces.

Figure 3:
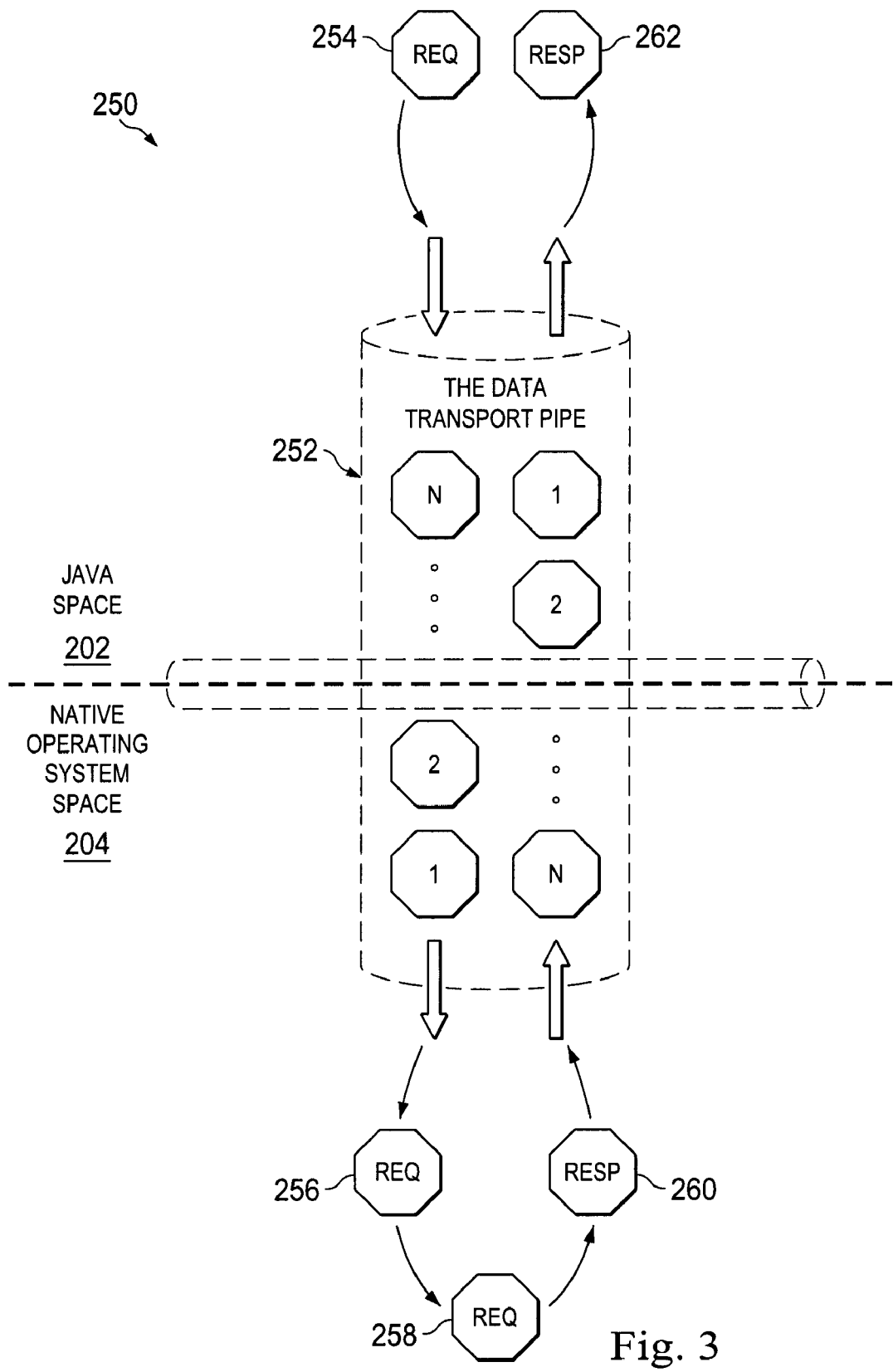
FIG. 3 illustrates a single pipe string driven data transport architecture according to an embodiment of the present disclosure.

FIG. 3 illustrates one embodiment of a single pipe string driven data transport architecture 250 according to the present disclosure. The single pipe string driven data transport architecture 250 includes a Java space 202 and a native operating system space 204. The data transport pipe 252 integrates legacy instrumentation agents of the native operating system space 204 and new instrumentation agents of the JAVA space 202 into a single integrated systems management application.

According to an embodiment of the present disclosure, the architecture successfully satisfies the application requirements mentioned herein above. The single pipe architecture contains a static core set of API in its framework. The API, as described further below, constitutes the pipe that transports data between the native subsystem and Java using a string as a transport vehicle. Information on both sides of the pipe are converted into strings. Strings going down the pipe (from the Java space to the native operating system space) contains the request for information (RFI) command, while strings going up the pipe (from the native operating system space to the Java space) contain "the information" which may be of any format. For extensibility, the open manage system administrator (OMSA) uses XML for the information format. At the bottom of the pipe, RFI commands are defined and mapped for access points to the instrumentation agent layer. As services grow, new RFI commands are defined to expose the information to the presentation layer. Services are defined as a group of related information or object in the Java lingua.

As mentioned above, the single pipe architecture contains a static core set of API in its framework. The static core set of API include a single pipe core framework API at the top of the pipe in Java and a single pipe core framework API at the bottom of the pipe in the native OS space. A example of illustrative code is provided below. Accordingly, the core set of API constitute the pipe used to transport data between the native subsystem and Java, further using a string as a transport vehicle.

Single Pipe Core Framework API at the Top of the Pipe in Java

```
/**
 * @param      requestCmd   The request command name value pair
 * @return                  The command result string in XML
 * @throws InvalidRequestException
 */
String sendCmd (String [ ] requestCmd) throws InvalidRequestException;
```

Single Pipe Core Framework API at the Bottom of the Pipe in C

```
//-----------------------------------------------------------------------
// @param    numNVPair   The number of name-value pair argument
// @param    ppNVPair    The list of name-value pair strings
//                       where RFI command is defined
// @return               Pointer to the information string
//-----------------------------------------------------------------------
```

-continued

```
typedef astring * (_cdecl *FPROCOMADBSENDCMD) (
            _IN s32 numNVPair,
            _IN astring **ppNVpair
            );
//-----------------------------------------------------------------------
// @param    data        Memory containing the string to free
// @return               NONE
//-----------------------------------------------------------------------
typedef void (_cdecl *FPROCOMADBFREEDATA) (
            _IN astring *data
            );
```

In connection with the single pipe string driven architecture of the present disclosure, the pipe code base remains static as services grow, while minimal changes occur on both ends of the pipe. Data types are converted to and from strings on both ends of the pipe, simplifying the Java-Native integration point. As services grow, new command strings are added. The pipe architecture or framework, once established, does not need test regression and facilitates, thus minimizing maintenance. Calling parameters are bundled into a single string in name-value pairs format, while a return string may vary in format. In addition, the open manage system administrator uses XML for extensibility.

With the pipe architecture of the embodiments of the present disclosure, data access to instrumentation agents is not restricted to a native implementation. In addition, data access from Java is allowed.

With the pipe architecture embodiments of the present disclosure, the addition of a subsystem service requires only a new command string definition. No changes to the pipe framework are needed. Addition of a new command string requires only compilation in the data access module and the calling Java classes. Any modification to the subsystem API affects only the command string definition. Accordingly, changes to the pipe architecture specification or definition requires an update and testing of the static small footprint framework code base.

Referring again to FIG. 3, the single pipe string driven data transport architecture 250 according to an embodiment of the present disclosure will be further discussed in the context of an example illustration. A client X sends a request in the form of a request string at 254 to the pipe 252. The request string can include a number of components (1 to N) and be of the following format: [ModuleName] [CommandName] [Arguments] . . . , where CommandName and Arguments are of NVPairs format (omacmd=CommandValue), where NVPairs stands for name-value pairs (name=value). For example, the request string "hipda omacmd=setassettag oid=345560 AssetTag=x7u5rab" includes the module name "hipda" as well as a command and arguments in the form of three name-value pairs.

Upon receiving the request string at 256, the ModuleName is resolved to the actual module (for example, module Y) corresponding to the interface to the instrumentation subsystem. At 258, module Y is loaded into memory if not already done so. CommandName is resolved to the associated function call (for example, function Z). At 258, function Z is also called. Access to the instrumentation subsystem is done at this point, wherein the input string is processed. In addition, a response in the form of a response string is generated and delivered to pipe 252 at 260. At 262, client X receives the response. The response string can include a number of components (1 to N) and be of any format. In one embodiment, the open manage system administrator uses an open standard XML for exstensibility. Furthermore, an example response string might include: "<hipda><Status>0</Status><AssetTag>x75rab</AssetTag></hipda>".

Figure 4:
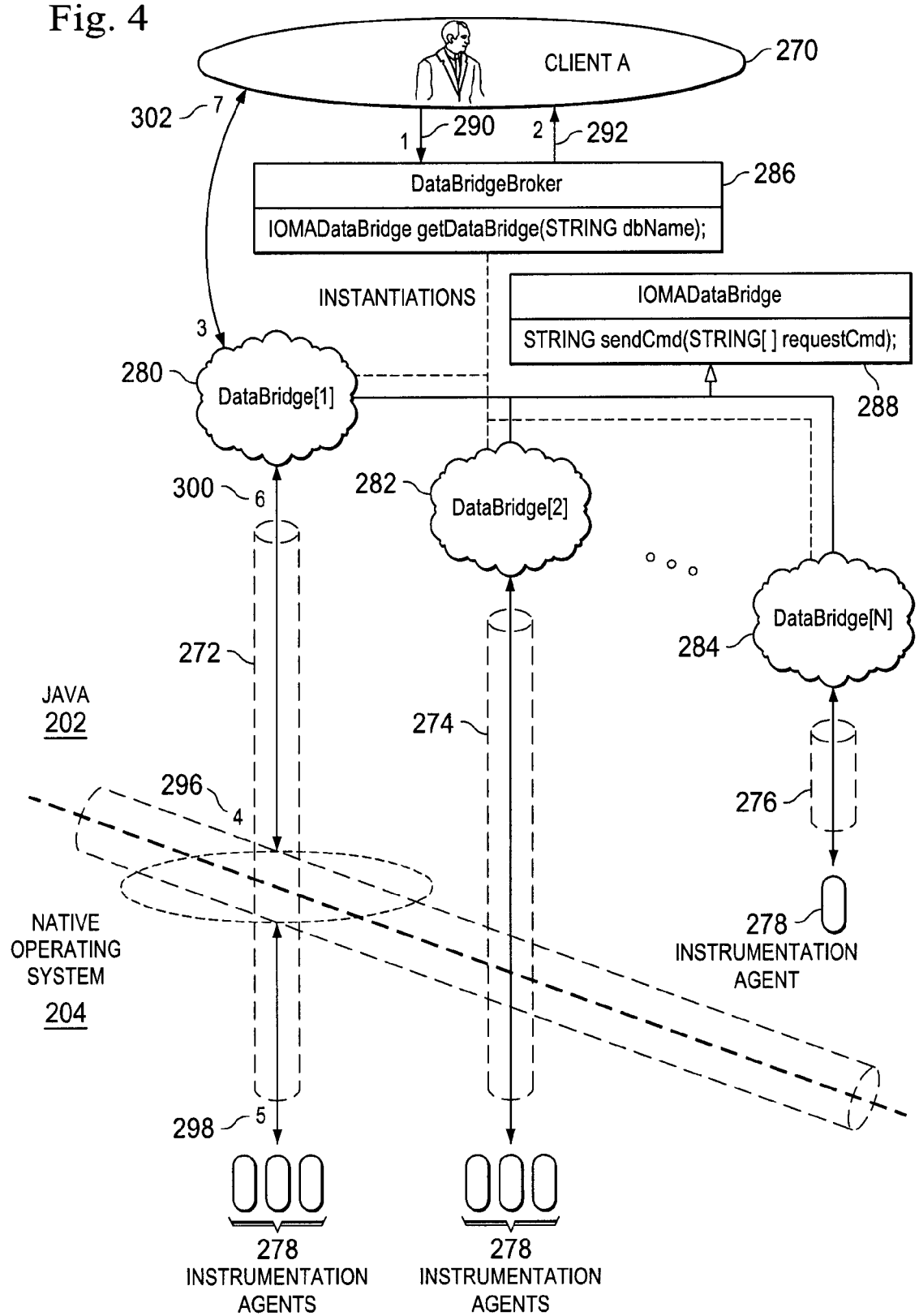
FIG. 4 illustrates an applications and data flow diagram of the single pipe architecture according to another embodiment of the present disclosure.

FIG. 4 illustrates an applications and data flow diagram of the single pipe architecture 270 according to another embodiment of the present disclosure. FIG. 4 depicts multiple applications of the Single Pipe architecture of the present disclosure. The diagram illustrates a three piping system including pipes 272, 274, and 276, the three piping system enabling data mining from an arbitrary number of instrumentation agents 278 both in the native operating system space 204 and Java space 202. The DataBridge object (280, 282, and 284) acts as an engine that drives and marshals data through the respective pipe (272, 274, and 276). The DataBrokerBridge 286 is responsible for managing and maintaining the DataBridge objects via respective instantiations. An IOMADataBridge 288 is also provided. The DataBrokerBridge is the single point of contact for the DataBridge objects. Once a client has reference to the DataBridge object, it is able to make direct request to it.

In the context of an example illustration, in FIG. 4 at 290, Client A requests DataBridge X from the DataBridgeBroker, where X can include a number from 1 to N, corresponding to the number of DataBridges. At 292, Client A receives reference to DataBridge X from the DataBridgeBroker. Client A makes a direct request to DataBridge X at 294. The request is of a format similar and with similar processing through the pipe at 296, 298, 300, and 302, as discussed herein above with respect to FIG. 3. In one embodiment, if the request is to an instrumentation agent in the native operating system space, then the command includes "omadb" corresponding to the native module in the native operating system space. Similarly, if the request is to an instrumentation agent in the Java space, then the command includes "omajdb" corresponding to the Java module in the Java space.

According to embodiments of the present disclosure, an information handling system having a single pipe string driven data transport architecture includes a hardware independent execution environment subsystem, a native operating system environment subsystem, and a data transport pipe for integrating legacy instrumentation agents of the native operating system environment subsystem and new instrumentation agents of the hardware independent execution environment subsystem into a single integrated systems management application. The data transport pipe includes a native invocation interface for integrating the legacy and new instrumentation agents into the single integrated systems management application. Alternatively, the data transport pipe includes a hardware independent execution environment native interface for integrating the legacy and new instrumentation agents into the single integrated systems management application.

Still further, the data transport pipe includes a static core set of application programming interfaces (API) configured to transport data between the native operating system environment subsystem and the hardware independent execution environment subsystem via a string as a transport vehicle. Information on both ends of the data transport pipe are converted into strings. The strings, transported from the hardware independent execution environment subsystem to the native operating system environment subsystem through the data transport pipe, contain a request for information (RFI) command. Furthermore, the strings transported from the native operating system environment subsystem to the hardware independent execution environment subsystem through the data transport pipe contain information. In one embodiment, the information may be of any format, including extensible markup language (XML). In addition, the RFI commands can be defined and mapped for access points to the instrumentation layer of the native operating system environment subsystem. Still further, new RFI commands can be defined for a corresponding growth of services and to expose new information of the services to the presentation layer of the hardware independent execution environment or Java subsystem.

According to one embodiment of the present disclosure, technology and architecture comparisons are as follows. As indicated for the single pipe architecture, a cost of testing is minimized, as well as minimizing a cost of maintenance. Cost of testing is minimized in that API changes made in the instrumentation agent require only the addition or modification of a command string for testing. Cost of maintenance is minimized in a similar manner as with the cost of testing. Furthermore, the single pipe architecture is extensible and scalable, and provides for a robust and seamless integration. Robust and seamless integration results in that the bulk of the architecture is static as the subsystem API grows, guaranteeing stability, once established. Lastly, the simplified architecture and minimal changes frees up resources.

Although only a few exemplary embodiments have been described in detail above, those skilled in the art will readily appreciate that many modifications are possible in the exemplary embodiments without materially departing from the novel teachings and advantages of the embodiments of the present disclosure. For example, while the embodiments of the present disclosure have been described with respect to systems management and instrumentation agents, the embodiments are not limited to such an application or teaching. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system (IHS) having a single pipe string driven data transport architecture comprising:
   a processor in the IHS;
   a memory coupled to the processor for storing instructions executable by the processor
   a hardware independent execution environment subsystem in the IHS;
   a native operating system environment subsystem in the IHS;
   a data transport pipe for integrating legacy instrumentation agents of said native operating system environment subsystem and new instrumentation agents of said hardware independent execution environment subsystem into a single integrated systems management application;
   a single pipe architecture containing a static core set of application program interfaces (API) in its framework, including the static core set of API at a top of the pipe in JAVA space including a Java Native Interface (JNI) and a single pipe core framework API at a bottom of the pipe in native operating system (OS) space, wherein said data transport pipe is configured to transport data between said native operating system environment subsystem and said hardware independent execution environment subsystem via a string as a transport vehicle; and wherein strings transported from said hardware independent execution environment subsystem to said native operating system environment subsystem through said data transport pipe contain a request for information (RFI) command, and wherein strings transported from said native operating system environment subsystem to said hardware independent execution environment subsystem through said data transport pipe contain information.

2. The system of claim 1, wherein said data transport pipe includes a native invocation interface for integrating the legacy and new instrumentation agents into the single integrated systems management application.

3. The system of claim 1, wherein said data transport pipe includes a hardware independent execution environment native interface for integrating the legacy and new instrumentation agents into the single integrated systems management application.

4. The system of claim 1, further wherein information on both ends of the data transport pipe are converted into strings.

5. The system of claim 1, wherein a format of the information comprises extensible markup language (XML) format.

6. The system of claim 1, wherein RFI commands are defined and mapped for access points to the instrumentation agents of said native operating system environment subsystem.

7. The system of claim 1, further comprising:
new RFI commands, the new RFI commands defined for a corresponding growth of services and to expose new information of the services to a JAVA space presentation layer.

8. A method for implementing a single pipe string driven data transport architecture in an information handling system (IHS), comprising:
providing a processor in the IHS;
coupling a memory to the processor for storing instructions executable by the processor;
providing a hardware independent execution environment subsystem in the IHS;
providing a native operating system environment subsystem in the IHS;
integrating legacy instrumentation agents of said native operating system environment subsystem and new instrumentation agents of said hardware independent execution environment subsystem into a single integrated systems management application via a data transport pipe;
providing a single pipe architecture containing a static core set of application program interfaces (API) in its framework, including the static core set of API at a top of the pipe in JAVA space including a Java Native Interface (JNI) and a single pipe core framework API at a bottom of the pipe in native operating system (OS) space, wherein the data transport pipe is configured to transport data between the native operating system environment subsystem and the hardware independent execution environment subsystem via a string as a transport vehicle;
transporting strings containing request for information (RFI) commands from the hardware independent execution environment subsystem to the native operating system environment subsystem through the data transport pipe, and
transporting strings containing information from the native operating system environment subsystem to the hardware independent execution environment subsystem through the data transport pipe.

9. The method of claim 8, wherein integrating the legacy and new instrumentation agents into the single integrated systems management application via the data transport pipe includes using a native invocation interface of the data transport pipe.

10. The method of claim 8, wherein integrating the legacy and new instrumentation agents into the single integrated systems management application via the data transport pipe includes using a hardware independent execution environment native interface of the data transport pipe.

11. The method of claim 8, further comprising converting information on both ends of the data transport pipe into data strings.

12. The method of claim 8, wherein a format of the information comprises extensible markup language (XML) format.

13. The method of claim 8, wherein the RFI commands are defined and mapped for access points to the instrumentation agents of the native operating system environment subsystem.

14. The method of claim 8, further comprising:
creating new RFI commands, the new RFI commands defined for a corresponding growth of services and to expose new information of the services to the presentation layer of the hardware independent execution environment subsystem.

* * * * *